US006711595B1

(12) United States Patent
Anantharao (10) Patent No.: US 6,711,595 B1
(45) Date of Patent: Mar. 23, 2004

(54) METHOD AND APPARATUS FOR SHARING STANDARD TEMPLATE LIBRARY OBJECTS AMONG PROCESSES

(75) Inventor: Vijapurapu V. Anantharao, Campbell, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/568,562

(22) Filed: May 9, 2000

(51) Int. Cl.[7] .............................. G06F 12/00; G06F 7/30
(52) U.S. Cl. ........................................ 707/206; 707/100
(58) Field of Search ................................ 707/100, 206, 707/10; 711/147, 202, 170, 205, 211

(56) References Cited

U.S. PATENT DOCUMENTS

| 5,146,607 | A | | 9/1992 | Sood et al. ................... 711/211 |
|---|---|---|---|---|
| 5,247,673 | A | | 9/1993 | Costa et al. .................. 711/205 |
| 5,619,685 | A | * | 4/1997 | Schiavone .................... 703/20 |
| 5,890,189 | A | * | 3/1999 | Nozue et al. ................. 711/100 |
| 6,023,281 | A | * | 2/2000 | Grigor et al. ................ 345/543 |
| 6,295,584 | B1 | * | 9/2001 | DeSota et al. ............... 711/147 |
| 6,301,582 | B1 | * | 10/2001 | Johnson et al. .......... 707/103 R |

OTHER PUBLICATIONS

Stallings, William, "Operating Systems Internal and Design Principles", Third Edition, 1998, p.147, 149.*
Shankel, J. "STL's Red–Black Trees", Dr. Dobb's Journal, Apr. 1998, vol. 23, No. 4 p.54, 56, 58, 60.*
Wise, G. Borden, "An Overview of the Standard Template Library", 1995, www.cs.rpi.edu/~wiseb/xrds/ovp2–3b.html.*
"A modest STL tutorial", Brown Education, downloaded www.cs.brown.edu/people/jak/proglang/cpp, 23 pgs., Mar. 10, 2000.
G. Bowden Wise, "An Overview of The Standard Template Library", downloaded www.cs.rpi.edu/~wiseb/xrds, 9 pgs., Feb. 25, 2000.

* cited by examiner

Primary Examiner—Greta Robinson
Assistant Examiner—Susan Rayyan
(74) Attorney, Agent, or Firm—Fish & Richardson P.C.

(57) ABSTRACT

Methods and apparatus, including computer program products for sharing a user STL object among processes. A shared memory segment is created. A system STL (Standard Template Library) map is anchored in the shared memory segment. A user STL object is received. An address is obtained for the user STL object by requesting storage from an allocator allocating memory from the shared memory segment to store at least one node of the user STL object and data added to the user STL object. The user STL object is inserted into the system STL map. Garbage collection is performed using the allocator, a first map containing a first set of nodes denoting sizes and addresses of a plurality of free blocks, and a second map containing a second set of nodes representing the addresses of and the pointers to the plurality of free blocks in the first map.

32 Claims, 6 Drawing Sheets

METHOD AND APPARATUS FOR SHARING STANDARD TEMPLATE LIBRARY OBJECTS AMONG PROCESSES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. §1.14.

TECHNICAL FIELD

This invention relates to memory management in a computer system, and more particularly to sharing of lookup data by loading lookup data into standard template library objects (STL objects) in a shared memory.

BACKGROUND

Modern data processing systems that support several processes simultaneously are defined as multiprocessing systems. More specifically, a process can be defined as an address space, a thread of control operating within that address space, and a set of required system resources for supporting the execution of a program. Before execution, the data needed for program execution and on which the program operates is loaded into the address space. In a multiprocessing system, several processes may execute and share data; some of the data used in different processes are the same for subsequent processes, and are termed "shared data."

In multiprocessing systems, a plurality of processes may execute simultaneously for higher performance. The processes may be interconnected by a system bus through which they communicate among themselves and with commonly shared resources, such as input/output units and working memories. Shared memory is a reserved memory area to which all of the sharing processes have access; different access methods allow the processes to use the shared memory with different performance characteristics.

Sharing of data structures between processes, specially the sharing of Standard Template Library object (STL objects), has always been a desirable functionality. The Standard Template Library (STL) comprises a set of C++ generic data structures and algorithms, and the STL provides reusable, interchangeable components adaptable to many different uses in software development environment, some of which are described by G. Bowden Wise in *An Overview of the Standard Template Library*, available at www.cs.rpi.edu/~wiseb/xrds/ovp2–3b.html. This article is hereby incorporated by reference in its entirety.

Conventional operating systems such as Windows NT and other operating systems such as UNIX provide shared memory. NT provides shared memory in the form of memory-mapped files. However, the shared memory segment is not necessarily loaded in at the same address by default in different processes or in the same program. Specifically, the MapMemoryFileEx Application Program Interface (API) function is used to request NT to load the shared memory segment at a particular address. It is of very little relevance whether the memory segment is loaded in the same address for offset-based data structures like an array, because, even if the same data structure is loaded at different addresses in different processes, the computations are done based on the offsets. It is of great importance, however, whether the memory segment is loaded in the same address for pointer-based data structures, where an address in one process is not correlated to an address in another process.

SUMMARY

STL objects are pointer-based data structures. Addressing the deficiency in the traditional file-based approach, this invention provides a technique to load STL objects to allow sharing of the STL objects by a plurality of processes. In one embodiment, this invention implements sharing of any number of STL objects between processes and threads using New Technology's (NT's) Section Objects (or shared memory) and special STL allocator function. Data which are needed by more than one process are stored in user STL objects, and the user STL objects are placed in the same memory segment. By attaching the shared memory segment, multiple processes may have access to the stored data.

In one aspect, the invention features a computer-implemented method or an apparatus comprising a computer-readable medium having a plurality of sequences of instructions stored thereon for sharing data structures among processes by using a shared memory segment. The method includes creating the shared memory segment, anchoring a system STL (Standard Template Library) map in the shared memory segment, receiving a user STL object, obtaining an address for the user STL object, and inserting the user STL object into the system map.

In another aspect, the invention is directed to a method or an apparatus comprising a computer-readable medium having a plurality of sequences of instructions stored thereon for conducting garbage collection by an allocator, the allocator capable of allocating storage for a user STL object in a shared memory segment common to a plurality of processes. The method includes creating a first map containing a plurality of nodes representing a plurality of free blocks, each block represented in the first map by a node denoting a size and an address of the free block, responding to an allocation request, and responding to a deletion request by entering a size and an address of a deleted block into the first map.

In yet another aspect, the invention is directed to a computer system implementing a data-sharing scheme capable of supporting a shared memory segment common to a plurality of processes, the computer having a processor for executing instructions, a memory for storing instructions, the computer system. The computer system includes the shared memory segment, a system STL map anchored in the shared memory segment, and a plurality of user STL objects, wherein each object is named and is seated in the STL map by inserting a name and an address of the object into the system STL map.

Various implementations of the invention may include one or more of the following features. The user STL object may have a name. The shared memory segment may be named and may comprise approximately 10 MB of memory. The user STL object may comprise created or existing user STL object. The obtaining step may consist of returning the address of the user STL object if the name of the user STL object is in the system. STL map. The obtaining step may consist of returning a next allocation address from the shared memory segment if the name of the user STL object is not in the system STL map.

The method may consist of updating the next allocation address by increasing the next allocation address by an allocated size of the user STL object. The inserting step may consist of entering the name and the address of the user STL object into the system STL map.

Further the method may consist of requesting storage from an allocator, wherein the allocator allocates memory from the shared memory segment to store at least one node of the user STL object and data added to the user STL object. The data may comprise an entity capable of supporting a single writer and a plurality of readers. An access to the address of the next allocation may be synchronized. The allocator may performs garbage collection. The processes may be threaded.

Implementation of the invention may include one or more of the following features. The responding to an allocation request step may return an address of a free block in the plurality of free blocks if the allocation request is for a storage size equal to or smaller than the free block. The responding to an allocation request step may allocate memory from the shared memory segment. It may provide a snapshot of the shared memory segment. The snapshot may include a total size of the shared memory segment. The first map may be available to only one process of the plurality of processes and the one process may be a writer process. The shared memory segment may be named and may consist of about 10 MB of memory. Addresses of the plurality of user STL objects may comprise addresses of the STL objects existing in the system STL map, and may comprise next allocation addresses.

An allocator may manage a garbage collection process responding to allocation requests and deletion requests. The allocator may allocate memory from the shared memory segment to store at least one node and data contained in each user STL object. At least one node may contain pointers to accounting information. A first map may contain a first set of nodes denoting sizes and addresses of a plurality of free blocks and a second map containing a second set of nodes representing the addresses of and pointers to the plurality of free blocks in the first map. The allocator may insert a newly-freed block contained in a deletion request into the first map and the second map. The allocator may coalesce the plurality of free blocks in the first map after responding to deletion requests by combining an existing free block in the plurality of free blocks with by an adjacent newly-freed block.

Sharing of STL objects among processes as described herein has one or more of the following advantages. One advantage of this invention is its total portability between different versions of the STL because the invention does not utilize the STL at a source code level. Another advantage of this invention is that it is intuitive and easy to use, requiring no new methods or interfaces for the developer to learn. Yet another advantage of the invention is its ability to store any number of STL objects in one shared memory segment, with the shared memory instrumented to provide various usage details such as total size of the shared memory segment, total number of free blocks in the free store, and the granularity of the free blocks. Furthermore, this invention eliminates any type of same-machine sockets and COM usage, thus freeing valuable resources. As soon as the shared memory is mapped to the requesting process, access to the data is instantaneous. Finally, this invention offers the advantage of freeing the developers from the memory handling details, such as garbage collection.

The primary usage for this invention is for lookup data, where lookup data can be defined as an entity with a single writer and multiple readers. One process, typically an NT service, loads the lookup data and writes the data to the STL objects in shared memory. The data are available to the other processes once the processes load the shared memory.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

STL objects are pointer-based data structures; they are conceptually understood as containers, or objects that contain other objects or contain pointers to objects. Containers at one level are data structures that manage a collection of elements and are responsible for the allocation and deallocation of those elements from memory. Containers typically have constructors and destructors along with operations for inserting and deleting elements. STL provides a variety of container types, include vectors, lists, dequeues, sets, maps, multimaps, queues, stacks, and the like. A simple container example is a vector, which is very much like an array with the ability to grow dynamically in size. A more complex type of container is the STL map, which is implemented as a balanced Red-Black Tree.

A Red-Black Tree is a tree with (key, value) pairs as the nodes; it is called "red-black" because every node is colored either red or black. STL maps represent a mapping from one type (the key type) to another type (the value type); the keys have to be unique, except for a multimap which allows duplicate keys, wherein each key may be associated with several values. In a STL map implemented as a Red-Black Tree, every node in the Tree has a value, and the value of any node is greater than the value of its left child, but less than the value of its right child. Every red node that is not a leaf has only black children. Every path from the root to a leaf contains the same number of black nodes, and the root node is black.

Generally, an STL object has two components: nodes and data. Nodes contain pointers to the previous and next nodes and any other accounting information like pointer to the data. In one implementation according to the technique of this invention, storage for both the nodes and the data of the STL object is allocated from the shared memory segment to ensure proper sharing—if storage is allocated only for the data from the shared memory segment, then other processes will not succeed in using the STL objects, as the nodes will be allocated memory by a process-specific private heap. STL objects have a default allocator to allocate memory from the heap. However, the design of the STL allows for a customized allocator, as explained below in connection with FIG. 5, to allocate memory from another location, such as a shared memory. This customized allocator tracks how much memory is used, how much memory is left in the shared memory segment, and the address for the next allocation, and the like.

Traditionally, data shared among a plurality of processes are stored in a file. While the traditional approach is adequate for simple object types such as integers and such, it is lacking in its ability to handle pointer-based data structures. STL objects, with its pointer-based data structures, constitute a good alternative to the traditional approach.

Figure 1:
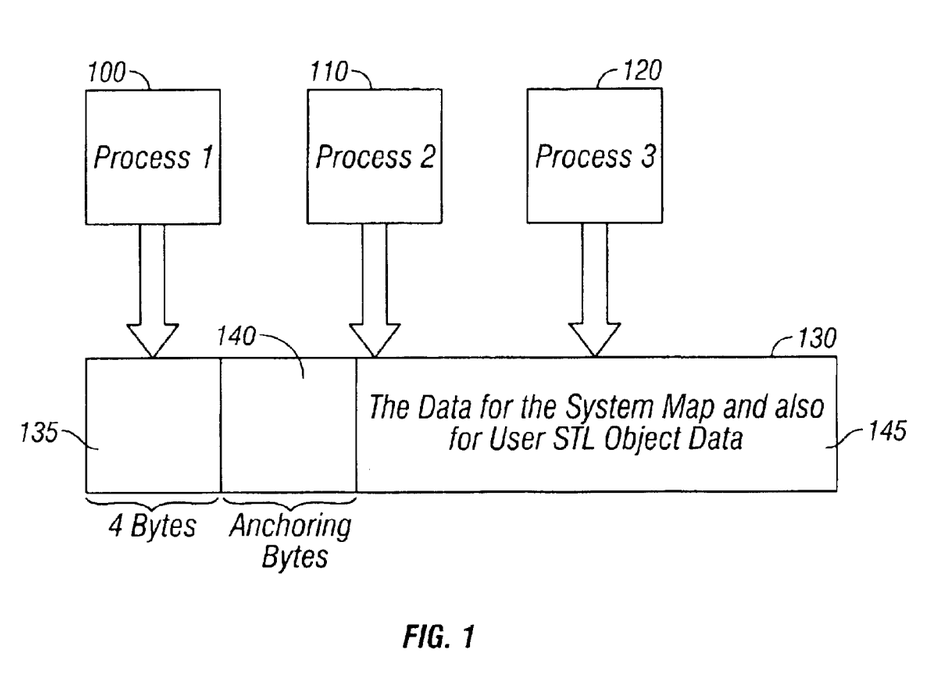
FIG. 1 illustrates a block system diagram for a shared memory segment common to three processes.

Referring to FIG. 1, the schematic diagram explains the layout of a multiprocessor system including the shared memory segment 130 common to three processes: process 1 (100), process 2 (110), and process 3 (120). More than three processes can share the memory segment 130, but three processes are used here for illustrative purposes.

Process 1 (100) creates the named shared memory segment 130, which is of a fixed size of 10 MB in one implementation. Process 1 (100) creates an STL system map in the shared memory 130 starting with a predetermine position such as byte 5 in section 140. This system map is an STL map designed to store the name and address of STL objects in the shared memory segment 130. The STL system map is anchored in the shared memory segment 130 starting at byte 5, and continues for the size of the map header determined at run-time.

The first four bytes constitute section 135 of the shared memory segment 130, representing the bytes for storing the next available address of the shared memory segment 130. For example, after the STL map is anchored at byte 5, the first four bytes of the shared memory segment 130 will now have a value of size of the map header, plus four, representing the next available address for any user STL object allocation. The data for the system map and the other user STL objects are stored in section 145 of the shared memory segment 130.

Figure 2:
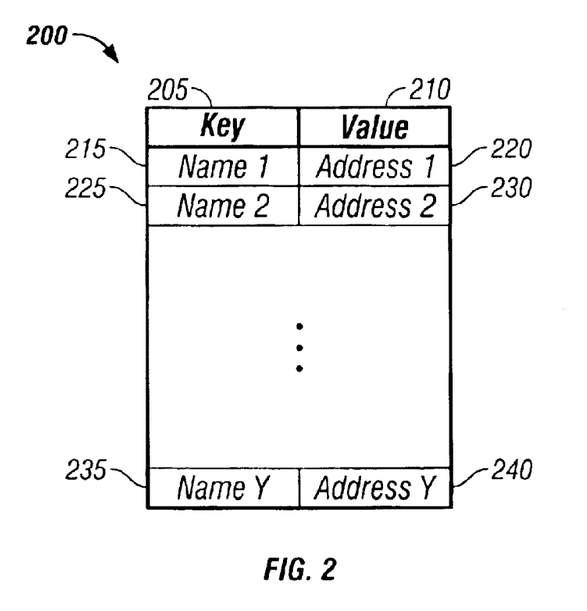
FIG. 2 illustrates an exemplary data structure diagram for an STL system map.

FIG. 2 shows a graphical representation of a data structure for system map 200. Every user STL object stored in system map 200 is represented as a row, with row heading 205 for key, and row heading 210 for value. For example, the first user STL object has name1 215 as key, at address1 220 as value. The second user STL object has name2 225, at address2 230. All user STL objects are listed as a series of rows until the last object in system map 200 is reached; this last user STL object has nameY 235 and addressY 240. Essentially, system map 200 is a mapping that uses as key the name of a user STL object and maps the name of the object to the address at which the object resides.

Figure 3:
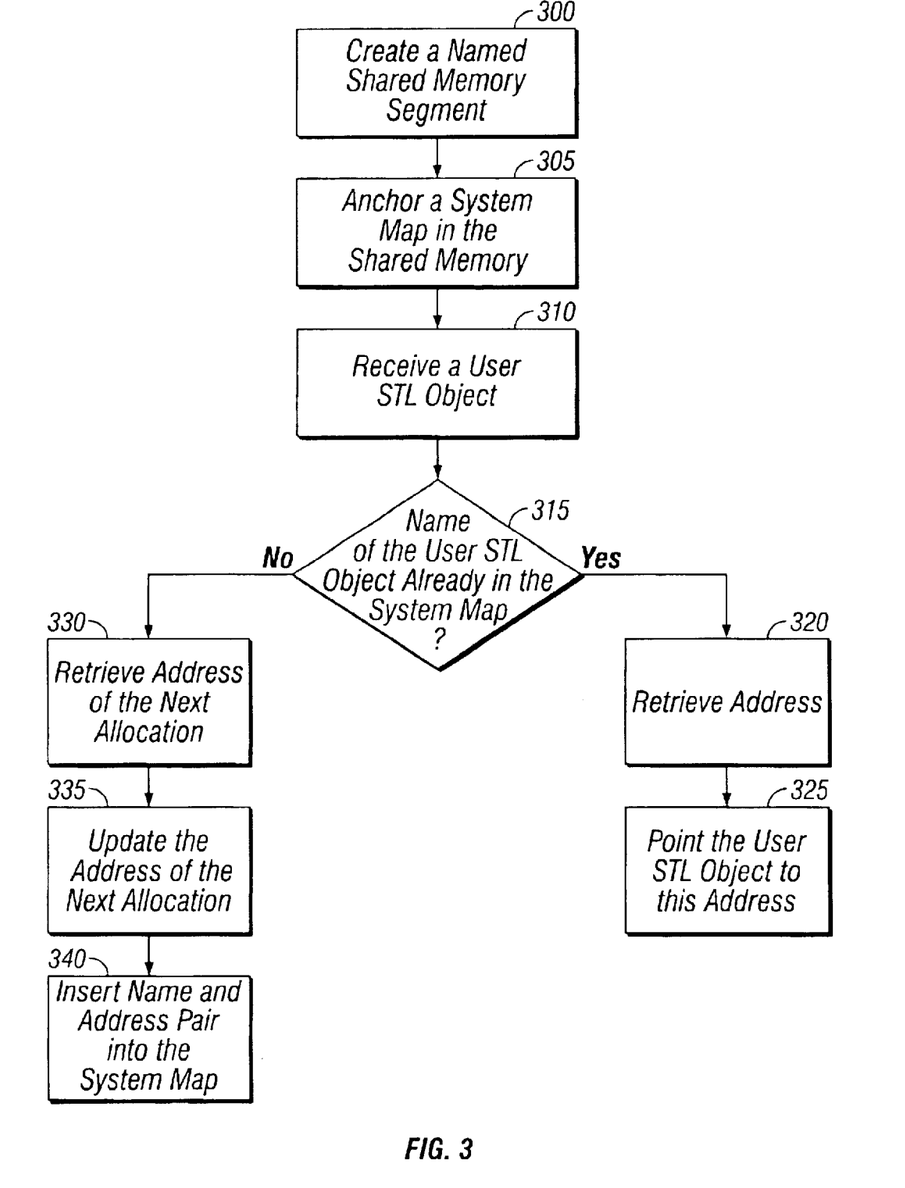
FIG. 3 is flowchart of a computer program implementation of the method of the invention.

Referring to FIG. 3, the process of sharing data is explained by way of a flow chart. Initially, the shared memory segment 130 is created and identified with a name (step 300). After the system map 200 is anchored in shared memory segment 130 (step 305), a user STL object is created or received by, for example, Process 2 (step 310). All STL objects, in one implementation of the invention, are named objects. The system map 200 is examined to determine whether the name of this STL object already exists (step 315). If the name already exits, the associated address of the object is retrieved (step 320) from the system map 200, which stores the names and addresses of user STL objects in the shared memory 130. Furthermore, the object is pointed to the address associated with the name (step 325). If the name does not exist, the system calls an allocator that allocates storage from the shared memory segment for the user STL object. The allocator obtains the address for the next allocation by reading the first 4 bytes of the shared memory segment 130 (step 330). As previously stated, the first four bytes of the shared memory segment 130 always contain the address for the next allocation in one implementation. After obtaining the address, the same four bytes are updated with the new address for the next allocation (step 335). The new next allocation address is obtained by adding the original value and the current allocation size. In one implementation, this function ensures that no more than one process updates the address at the any given time.

Once an address is obtained, the name and the address pair of this previously unknown user STL object is inserted into the system map 200 (step 340). As the user adds data to the user STL object, the STL object requests storage from the same allocator, which in turn allocates memory from the shared memory 130.

Now both Process 1 and Process 2 refer to the same STL object at the same address. Different processes identify the same STL objects with the same address in the shared memory segment 130 by the same name. In other words, when the name is not found in the system map 200, an object is created and seated; if the name exists, the object is made to point to an already-existing location. This process is similar to the process through which NT handles kernel objects in different processes by giving them the same name.

Figure 4A:
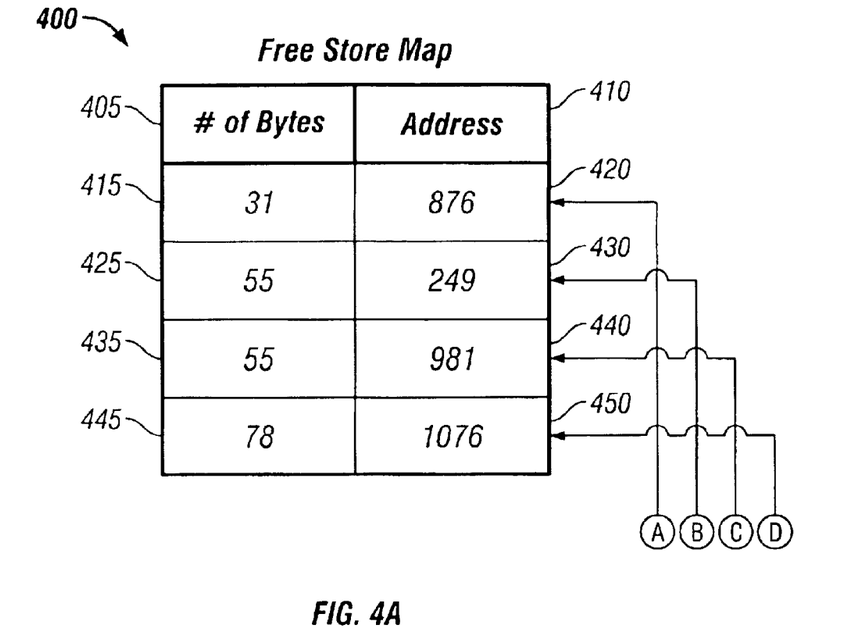
FIG. 4A illustrates a data structure representing a free store map.
Figure 4B:
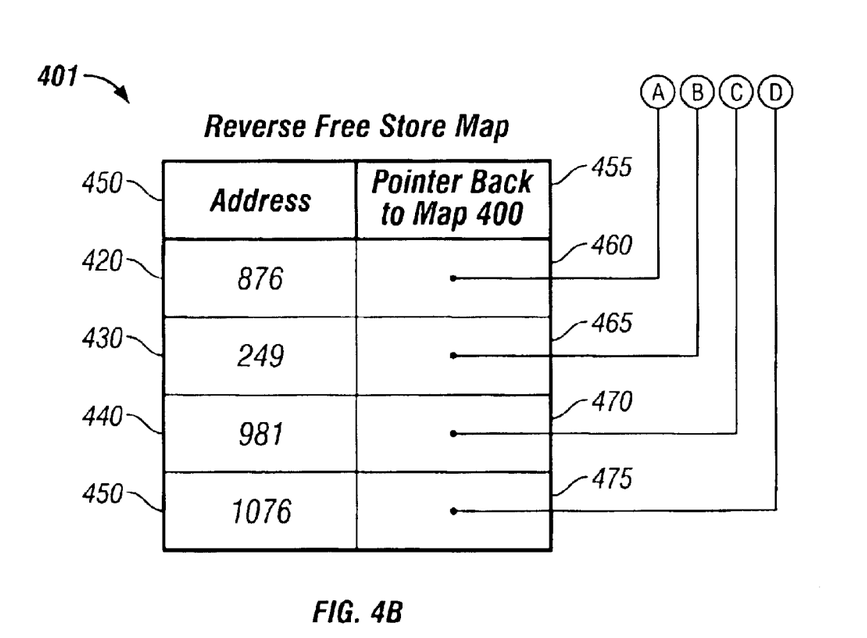
FIG. 4B illustrates a data structure representing the reverse free store map.
Figure 6:
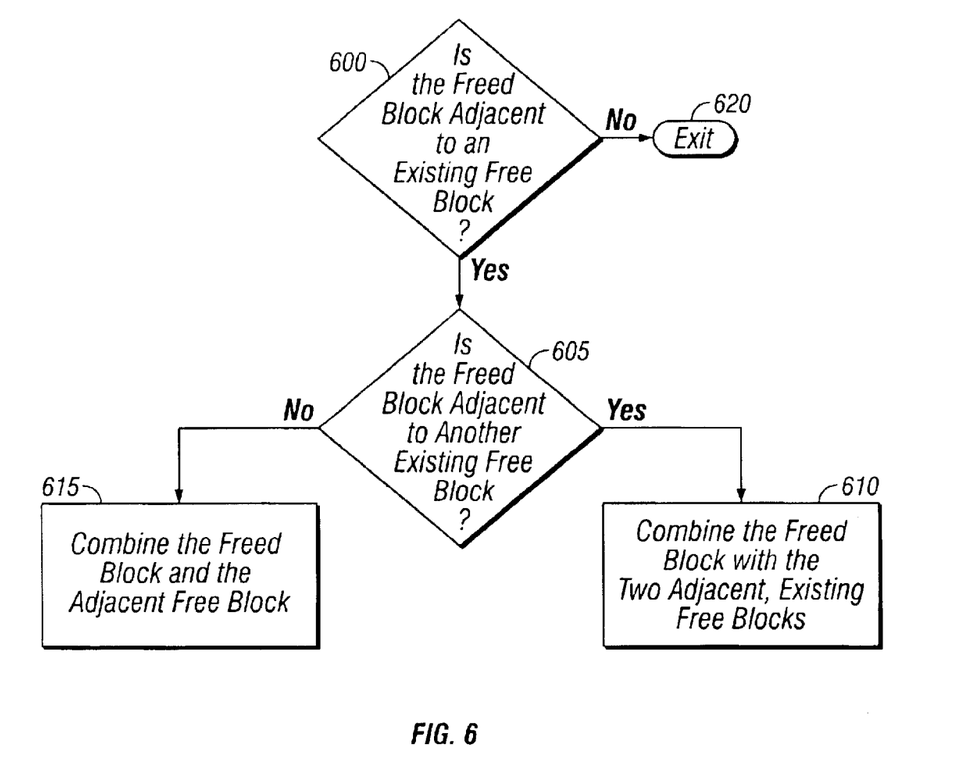
FIG. 6 is a detailed flowchart of a computer program implementation detailing the coalescing functionality of the allocator function.

The allocator also does garbage collection. Temporary objects are created when data is added to an STL object; these temporary objects need to be reclaimed once released to maximize storage space. Furthermore, some elements/nodes, such as an existing object, can be deleted by the user. The allocator does garbage collection by keeping track of released memory in two STL objects, a free store map 400 and a reverse free store map 401. The data structure of the two map objects are shown in FIG. 4A and FIG. 4B. The free store map 400 is a multimap that contains pairs of size (405) of the allocation and its address (410) of free blocks as the nodes. For example, in FIG. 4A there are four free blocks:

| | |
|---|---|
| BLOCK 1: 31 | 876 |
| BLOCK 2: 55 | 249 |
| BLOCK 3: 55 | 981 |
| BLOCK 4: 78 | 1076 | a block of size 31 bytes (415) at address 876 (420), two blocks of size 55 bytes (425 and 435) at addresses 249 and 981 (430 and 440) and a block of size 78 bytes (445) at address 1076 (450). The key of the free store map 400 is size, or number of bytes (405). In other words, the map is sorted by size. For example, if an allocation request for 55 bytes comes in, the system will quickly locate BLOCK 2 with size 55 bytes (425) at address 249 (430) and deletes this entry from the free store map 400. Even though BLOCK 3 also satisfies the size limitation, the system, in one implementation, returns the first free block located in the free store map 400. This map 400 is useful in an allocation request where a free block with the right size can be quickly located. Once a free block of the right size is located for an allocation request, it needs to be deleted from the free store map 400. An STL mutimap in general deletes all entries corresponding to the key. Therefore, in this case, both BLOCK 2 and BLOCK 3 will be deleted by standard STL operation, an undesirable result. In one implementation, the reverse free store map 401 is used in this delete operation ancillary to an allocation request to make sure only one free block in free store map 400 is deleted, as will be explained below. The reverse free store map 401 will also be used in an independent deletion request not associated with an allocation request, as explained below in conjunction with FIG. 6.

The reverse free store map 401 is shown in FIG. 4B. The use of the reverse free store map 401 is in the context of a deletion request, where the input parameter is the address (450) rather than size (405). Associated with the address 450 in the reverse free store map 401 is pointer 455 pointing back to free store map 400. The key of the reverse free map 401 is address 450. When an ancillary deletion request is encountered, the system searches reverse free store map 401 for a corresponding address and a pointer back to the free store map 401. The same four free blocks shown in FIG. 4A is repeated for FIG. 4B.

As stated above, when the suitable free block with 55 bytes (425) at address 249 (430) is to be deleted from the free store map 400, the system searches for a pointer from among pointers 460–475 that corresponds to address 249 (430) in the reverse free store map 401. Pointer 465 corresponds to address 249 (430), and points back to the right entry of size 55 (425) and address 249 (430), which will be allocated in response to an allocation request and needs to be deleted from the free store map 400.

Figure 5:
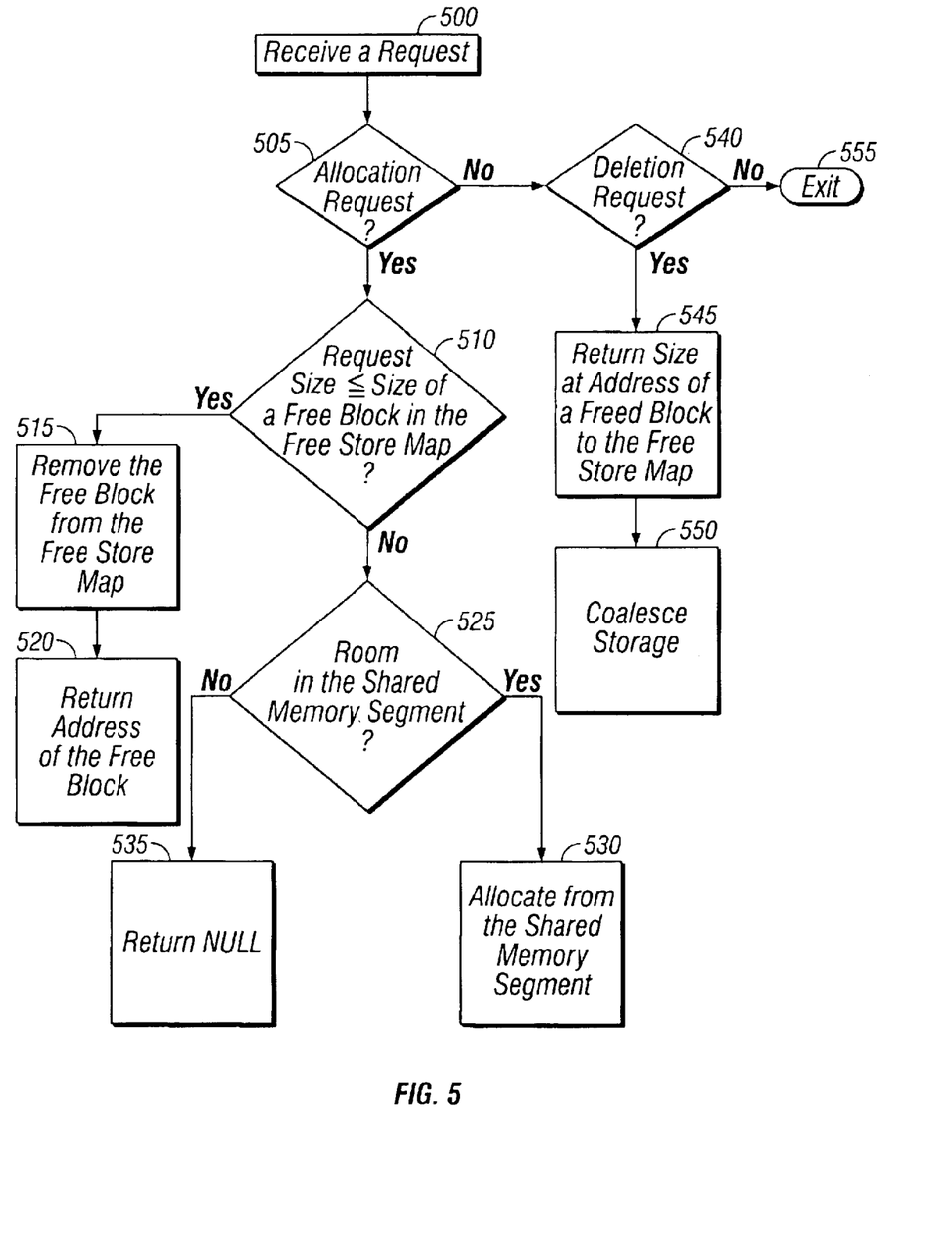
FIG. 5 is a flowchart detailing the allocator function's responses to allocation and deletion requests.

FIG. 5 is a flow chart of how the allocator keeps track of requests for allocation and deletion. The input parameter for an allocation request is the size of storage requested. The function returns, in one implementation, an address for the first free block found in the free store map 400 of equal or greater size. If no existing free block in the free store map 400 of equal or greater size is found, the return value is the address of a new block of exactly the requested size from the shared memory segment 130. The allocator also keeps track of requests for deletion. The input parameter for a deletion request is the address of the block to be freed.

When a request for allocation comes in (step 505), it first checks in the free store map 400 for a block of an exact or larger size (step 510). If it exists, it is removed from the free store map 400 (step 515) and its address is returned to the caller (step 520). If this block is of larger size, the extra portion of the block is put back on the free store map 400. For example, the allocation request is for a size of 12 bytes. If the free store map 400 returns a block of 15 bytes at address 367, the extra 3 bytes of this block is returned to the free store map 400 at address 379 (367+12). If an equal or higher size is not found in the free store map 400, then shared memory segment 130 is checked for room(step 525). If space is found, memory will be allocated from the shared memory segment 130 (step 530). If there is not enough memory in the shared memory segment 130, NULL will be returned to the caller (step 535).

When a block of memory is freed via a deletion request (step 540), the allocator is again called. It returns (stores) the size and the address of a freed block to the free store map 400 (step 545). It also simultaneously coalesces the storage (step 550). Coalescing is the process by which any adjacent free blocks are combined to form larger free blocks. This process is explained by the flow chart of FIG. 6. There are four scenarios that could happen: (1) the current freed block is not adjacent to any existing free blocks. In this case, no coalescing takes place (step 620); (2) the current freed block is adjacent to an existing free block of lower address (step 600). The two are combined to form a larger free block (step 615); (3) the current freed block is adjacent to an existing free block of higher address (step 600). The two are combined to form a larger block (step 615); and (4) the current freed block falls exactly between two free blocks (step 605). In this case, the three free blocks are combined to form one free block (step 610). The coalescing calls for the use the free store map 400 and reverse free store map 401 again. While the address of the just-freed block is not in either map, a quick search is done to look for neighbors for coalescing as described above, returning a slot where the recently freed block should be inserted. After coalescing if any upper or lower neighbor is found, the coalesced block is inserted into free store map 400 and reverse free store map 401.

Another feature of the allocator is its ability to provide a snapshot of the current shared memory segment 130. By sending a special parameter to this function, it prints the total size of the shared memory segment 130, such as the size used, total number of free blocks in the free store map 400 and a distribution of allocation in terms of granularity i.e., how many blocks free with a size of 1–10 bytes, 11–20 bytes, 21–30 bytes, 31–40 bytes and more than 40 bytes.

The free store map 400 and the reverse free store map 401 are not stored in the shared memory segment 130; they are process-specific garbage collection mechanisms and are not available system-wide. In other words, any information regarding the free store map 400 available to one process is not visible to another process using the identical shared memory segment 130. If the processes are both writer and reader processes and each process has its own free store map and reverse free store map, there is a risk that certain pockets of available space in the shared memory 130 will be known to only one process. Therefore, the better implementation is to store the free store map 400 and the reverse store map 401 in a writer process only.

The two examples below illustrate two STL objects, one map and one vector. They are created in one process (with 'W' option) and read in the second process (with 'R' option). In effect, two processes are created by compiling and running each example first with the 'W' option, and then with the 'R' option. The objects created in the 'W' process can be accessed in the 'R' process.

```
#pragma warning (disable: 4786 4503)
#include "IvpSTL.h"
using namespace std;
void main(int argc,char** argv)
{
    KeyValMap m("MapTest");
    if (!strcmp(argv[1], "w"))
    {
        CIvpWriteString key, val;
        key = "key1";
        val = "value1";
        m.insert(make_pair(key, val));
        key = "key2";
        val = "value2";
        m.insert(make_pair(key, val));
        key = "key3";
        val = "value3";
        m.insert(make_pair(key, val));
        //If the shared memory usage needs to be seen for any diagnostics
```

-continued

```
        IvpStd::ManageFreeSlot(0,0,IvpStd::STATS);
        getchar( );
        return;
    }
//READ PORTION
    printf("in Read mode . . . \n");
    KeyValIter mapIt;
    CIvpReadString key("key2");
    mapIt = m.find(key);
    if (mapIt != m.end( ))
        cout <<
            "Key Found. Key = " <<
            (*mapIt).first <<
            " Value = " <<
            (*mapIt).second <<
            endl;
    else
        printf("end\n")
    return;
}
Example 2:
#pragma warning (disable: 4786 4503)
#include "IvpSTL.h"
using namespace std;
struct XYZ {
    int i;
    double d;
    CIvpWriteString s;
};
void main(int argc,char** argv)
{
    CIvpVector<XYZ> myVec("VectorTest");
    if (!strcmp(argv[1], "w"))
    {
        XYZ abc;
        abc.i = 12;
        abc.d = 34.67;
        abc.s = "First";
        myVec.push_back(abc);
        abc.i = 74;
        abc.d = 91.24;
        abc.s = "Second";
        myVec.push_back(abc);
        getchar( );
        return;
    }
//READ PORTION
    printf("in Read mode . . . \n");
    CIvpVector<XYZ>::VECDEF::iterator vecIt;
    for (vecIt = myVec.begin( ); vecIt != myVec.end( ); vecIt++)
        cout << "i = [" << (*vecIt).i << "] " <<
            "d = [" << (*vecIt).d << "] " <<
            "s = [" << (*vecIt).s << "]" << endl;
    return;
}
```

The above two examples can be combined to see two STL objects, one map and one vector, created in one process (with 'W' option) and read in the second process (with 'R' option).

Compile and run each example first with 'W' option and then with 'R' option. The STL object created in the first process can be accessed in the second process.

The thread-safety of STL objects in shared memory 130 is no different from that of objects residing in a process private heap. It is still the responsibility of the developer to ensure that different threads (processes) do not cause problems. In order to facilitate such a requirement which exists even without the shared memory 130, locking functionality can be added to the STL objects. The lock is, in one implementation, a Single Writer/Multi Reader Guard commonly known in the art.

Figure 7:
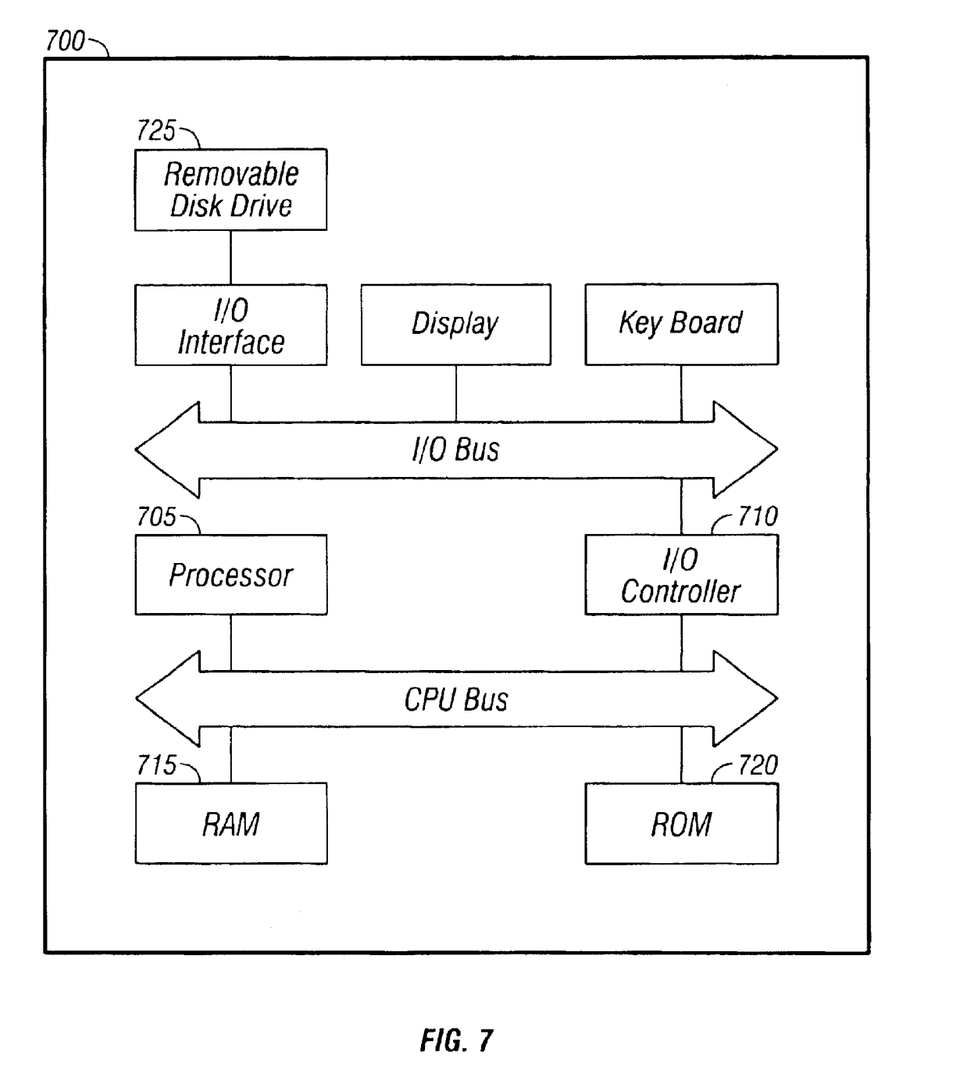
FIG. 7 is a block diagram illustrating exemplary computer hardware components that constitute a suitable environment within which the principles of a shared memory system of the present invention may be implemented and operated.

Referring to FIG. 7 the invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors 705 include, by way of example, both general and special purpose microprocessors. Generally, a processor will receive instructions and data from a read-only memory 720 and/or a random access memory. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks 225; magneto-optical disks; and CD-ROM disks. Any of the foregoing may be supplemented by, or incorporated in, custom-designed ASICs (application-specific integrated circuit).

The essential elements of a computer are a processor 705 for executing instructions and a memory. A computer can generally also receive programs and data from a storage medium such as an internal disk (not shown) or a removable disk 725. These elements will be found in a conventional desktop 700 or workstation computer as well as other computers suitable for executing computer programs implementing the methods described here.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for sharing a user STL object among processes, comprising:

creating a shared memory segment;

anchoring a system STL (Standard Template Library) map in the shared memory segment;

receiving a user STL object;

obtaining an address for the user STL object by requesting storage from an allocator, the allocator allocating memory from the shared memory segment to store at least one node of the user STL object and data added to the user STL object, inserting the user STL object into the system STL map to make the user STL object accessible to the processes; and performing garbage collection using the allocator, a first map containing a first set of nodes denoting sizes and addresses of a plurality of free blocks, and a second map containing a second set of nodes representing the addresses of and the pointers to the plurality of free blocks in the first map.

2. The method of claim 1, wherein the user STL object has a name.

3. The method of claim 1, wherein the shared memory segment is named and comprises approximately 10 MB of memory.

4. The method of claim 1, wherein receiving the user STL object comprises creating the user STL object.

5. The method of claim 2, wherein the obtaining step comprises returning the address of the user STL object if the name of the user STL object is in the system STL map.

6. The method of claim 2, wherein the obtaining step comprises returning a next allocation address from the shared memory segment if the name of the user STL object is not in the system STL map, and allocating space for the user STL object.

7. The method of claim 6, further comprising updating the next allocation address by increasing the next allocation address by an allocated size of the user STL object.

8. The method of claim 2, wherein the inserting step comprises entering the name and the address of the user STL object into the system STL map.

9. The method of claim 1, wherein the data comprise an entity capable of supporting a writer and a plurality of readers.

10. The method of claim 7, wherein an access to the next allocation address is synchronized.

11. The method of claim 1, wherein the processes comprise threaded processes.

12. An apparatus comprising a computer-readable medium having a plurality of sequences of instructions stored thereon including sequences of instructions which, when executed by one or more processors, cause said one or more processors to:
   create a shared memory segment;
   anchor a system STL (Standard Template Library) map in the shared memory segment;
   receive a user STL object;
   obtain an address for the user STL object by requesting storage from an allocator, the allocator allocating memory from the shared memory segment to store at least one node of the user STL object and data added to the user STL object;
   insert the user STL object into the system STL map to make the user STL object accessible to the processes; and
   perform garbage collection using the allocator, a first map containing a first set of nodes denoting sizes and addresses of a plurality of free blocks, and a second map containing a second set of nodes representing the addresses of and the pointers to the plurality of free blocks in the first map.

13. The apparatus of claim 12, wherein the user STL object has a name.

14. The apparatus of claim 12, wherein the shared memory segment is named and comprises approximately 10 MB of memory.

15. The apparatus of claim 12, wherein instructions to receive the user STL object comprise instructions to create the user STL object.

16. The apparatus of claim 13, wherein instructions to obtain the address comprise instructions to return the address of the user STL object if the name of the user STL object is in the system STL map.

17. The apparatus of claim 13, wherein instructions to obtain the address comprise instructions to return a next allocation address from the shared memory segment if the name of the user STL object is not in the system STL map, and to allocate space for the user STL object.

18. The apparatus of claim 17, the sequences of instructions further comprising instructions to cause said one or more processors to update the next allocation address by increasing the next allocation address by an allocated size of the user STL object.

19. The apparatus of claim 13, wherein instructions to insert the user STL object comprise instructions to enter the name and the address of the user STL object into the system STL map.

20. The apparatus of claim 12, wherein the data comprise an entity capable of supporting a writer and a plurality of readers.

21. The apparatus of claim 18, wherein an access to the next allocation address is synchronized.

22. The apparatus of claim 12, wherein the processes comprise threaded processes.

23. A computer system implementing a user STL object sharing scheme capable of supporting a shared memory segment common to a plurality of processes, the computer having a processor for executing instructions, a memory for storing instructions, the computer system comprising:
   a shared memory segment;
   a system STL map anchored in the shared memory segment;
   a plurality of user STL objects, wherein each STL object is named and wherein each STL object is seated in the STL map by inserting a name and an address of the STL object into the system STL map; and
   an allocator operable to manage a garbage collection process responding to allocation requests and deletion requests, the allocator using a first map containing a first set of nodes denoting sizes and addresses of a plurality of free blocks, and a second map containing a second set of nodes representing the addresses of and the pointers to the plurality of free blocks in the first map.

24. The computer system of claim 23, wherein the shared memory segment is named and comprises about 10 MB of memory.

25. The computer system of claim 23, wherein addresses of the plurality of user STL objects comprise addresses of the user STL objects existing in the system STL map.

26. The computer system of claim 23, wherein addresses of the plurality of user STL objects comprise next allocation addresses.

27. The computer system of claim 23, wherein the allocator allocates memory from the shared memory segment to store at least one node and data contained in each user STL object.

28. The computer system of claim 27, wherein the at least one node contains pointers to accounting information.

29. The computer system of claim 23, wherein the allocator returns a free block of an appropriate size from the plurality of free blocks in response to an allocation request and deletes the returned free block from the first map and the second map.

30. The computer system of claim 23, wherein the allocator inserts a newly-freed block contained in a deletion request into the first map and the second map.

31. The computer system of claim 30, wherein the allocator coalesces the plurality of free blocks in the first map and the second map after responding to the deletion request.

32. The computer system of claim 31, wherein the allocator coalesces the plurality of free blocks by combining an existing free block in the plurality of free blocks adjacent to the newly-freed block with the newly-freed block.

* * * * *